United States Patent
Wang et al.

(10) Patent No.: US 8,138,906 B2
(45) Date of Patent: Mar. 20, 2012

(54) VEHICULAR DISPLAY DEVICE AND METHOD OF OPERATION

(75) Inventors: Orson S. Wang, Livonia, MI (US); Maureen L. Roth, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 541 days.

(21) Appl. No.: 12/396,146

(22) Filed: Mar. 2, 2009

(65) Prior Publication Data

US 2010/0219946 A1 Sep. 2, 2010

(51) Int. Cl.
*B60Q 1/00* (2006.01)
(52) U.S. Cl. ............... 340/456; 701/1; 477/906; 74/335; 192/48.1
(58) Field of Classification Search .................. 340/456, 340/457; 192/48.1; 701/1, 51, 58; 477/906, 477/125, 110, 115; 74/335, 640
See application file for complete search history.

(56) References Cited

U.S. PATENT DOCUMENTS

| 4,989,470 | A | * | 2/1991 | Bulgrien ........................ 74/335 |
| 4,991,454 | A | * | 2/1991 | Bulgrien ........................ 74/335 |
| 5,351,570 | A | * | 10/1994 | Mizunuma et al. ............ 74/335 |
| 5,357,820 | A | * | 10/1994 | Moroto et al. .................. 74/335 |
| 5,486,147 | A | * | 1/1996 | Sakakiyama et al. ......... 477/125 |
| 6,056,669 | A | * | 5/2000 | Marshall ......................... 74/335 |
| 6,067,492 | A | * | 5/2000 | Tabata et al. .................... 701/51 |
| 6,462,651 | B1 | * | 10/2002 | Consiglio et al. ............. 340/456 |
| 2003/0164756 | A1 | * | 9/2003 | Hayashi et al. ................ 340/439 |

* cited by examiner

*Primary Examiner* — George Bugg
*Assistant Examiner* — Edny Labbees
(74) *Attorney, Agent, or Firm* — Ingrassia Fisher & Lorenz, P.C.

(57) ABSTRACT

An information presentation system for a vehicle is provided. The vehicle comprises a transmission operable in a plurality of gear states. The system comprises a sensor adapted to detect a gear state of the transmission, an electronic control system adapted to operate the transmission and to detect a gear state of the transmission, and a display device coupled to the sensor and to the electronic control system. The display device is adapted to receive a first signal indicating the gear state of the transmission, to receive a second signal indicating the gear state of the transmission, and to adjust an arrangement of visual elements in a manner influenced by the first and second signals.

20 Claims, 3 Drawing Sheets

VEHICULAR DISPLAY DEVICE AND METHOD OF OPERATION

TECHNICAL FIELD

Embodiments of the subject matter described herein relate generally to display systems for vehicles. More particularly, embodiments of the subject matter relate to display of transmission states.

BACKGROUND

Drive-by-wire systems are becoming more prevalent in vehicles, particularly for selecting operational states of the transmission. When using a gear selector of a drive-by-wire system, the operator moves the selector from a default or neutral position to indicate which gear should be selected. Some transmissions and systems constrain the selector to certain gear selection maps, preventing a direct change from, for example, a forward drive gear to the reverse gear.

The drive-by-wire system typically includes a display for communicating to the operator the gear in which the transmission is currently positioned. This is particularly useful to operators who are comfortable with previous models of transmissions wherein a gear was selected by positioning a lever or shifting arm in a designated location. Because the drive-by-wire selector returns to the default position after a gear change command, its position does not reflect the current gear engaged by the transmission.

Additionally, because the operator does not adjust the transmission by physically positioning the selector, the operator relies exclusively on the display to perceive the state of the transmission prior to operating the vehicle. The system relies on sensors and logic for determining the state of the transmission prior to displaying it. As such, an imperfection may result in an incorrect displayed gear location, which is undesirable.

BRIEF SUMMARY

An information presentation system for a vehicle is provided. The vehicle comprises a transmission operable in a plurality of gear states. The system comprises a sensor adapted to detect a gear state of the transmission, an electronic control system adapted to operate the transmission and to detect a gear state of the transmission, and a display device coupled to the sensor and to the electronic control system. The display device is adapted to receive a first signal indicating the gear state of the transmission, to receive a second signal indicating the gear state of the transmission, and to adjust an arrangement of visual elements in a manner influenced by the first and second signals.

A display device for a vehicle is also provided. The vehicle comprises a transmission having a plurality of gear states. The display device is adapted to receive a first signal that is indicative of a commanded gear state of the transmission, to receive a second signal that is indicative of an actual gear state of the transmission, to display a first visual image comprising a first foreground portion and a first background portion when the first and second signals indicate the same gear state of the transmission, and to display a second visual image comprising a second foreground portion and a second background portion when the first and second signals indicate different gear states of the transmission.

A method of displaying transmission gear state information to an operator of a vehicle is also provided. The transmission is operable in a plurality of gear states. The method comprises receiving a first signal from an electronic control system coupled to the transmission, the first signal conveying information indicating a gear state of the transmission, determining a gear state of the transmission with a sensor, the sensor operating independently of the electronic control system, receiving a second signal from a sensor coupled to the transmission, the second signal conveying information indicating a gear state of the transmission, comparing the gear state indicated by the first signal to the gear state indicated by the second signal, and presenting a first visual image to the operator of the vehicle in response to determining that the first and second signals convey information indicating different gear states.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component such as a display device or electronic control system may employ various integrated circuit components, e.g., memory elements, digital signal processing elements, logic elements, look-up tables, or the like, which may carry out a variety of functions under the control of one or more microprocessors or other control devices.

Figure 1:
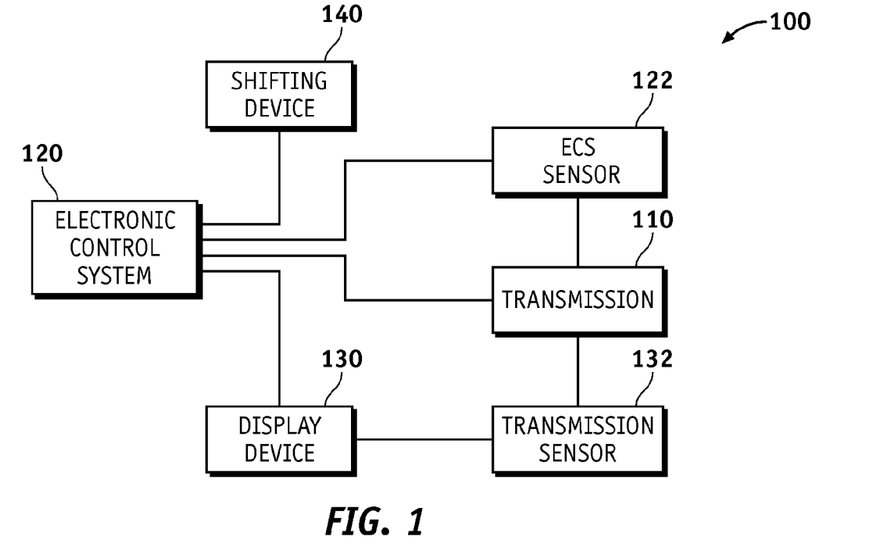
FIG. 1 is a schematic representation of an embodiment of a vehicle having a display device.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

To prevent incorrect operation of a transmission of a vehicle operated by a drive-by-wire system, the vehicle can include a display device. Alone, the display device, or other graphical presentation system, which indicates the currently-engaged gear of the transmission, can still be vulnerable to imperfections in the vehicle which can cause an incorrect state to be displayed. By independently verifying the engaged gear of the transmission and presenting information regarding the transmission position as provided by the electronic control system and a sensor directly engaged with the transmission, the display device can alert the operator to a potential error using a distinctive display pattern, as further described below.

FIG. 1 illustrates an embodiment of a vehicle 100 having an electronically-controlled or electrically-assisted transmission shifting mechanism. Such a shifting system is commonly referred to as a drive-by-wire system. The vehicle 100 comprises a transmission 110, an electronic control system 120, an electronic control system (ECS) sensor 122, a display device 130, a transmission sensor 132, and a shifting device 140. The electronic control system 120 can be operably coupled to the transmission 110, ECS sensor 122, to the display device 130, and to the shifting device 140. The transmission 110 can be coupled to the transmission sensor 132. Any suitable vehicle that uses a similar system for gear selection can be used, including but not limited to automobiles, watercraft, or motorcycles.

The transmission 110 can have several operational states which can be adjusted to operate the vehicle 100. Some exemplary operational states include "park", "reverse", "neutral", and "drive". Other states, such as lower gears, can also be present. The transmission 110 preferably enters one operational state to the exclusion of any other. An operator of the vehicle 100 can select the gear or operational state of the vehicle using the shifting device 140, which in turn causes 120 to issue appropriate command, request, and control signals, and/or instructions that cause 110 to change its state to the selected gear.

The shifting device 140 is, therefore, preferably manipulable by the operator to adjust the gear of the transmission. A change in the operational state of the transmission 110 is made in response to manipulation of the shifting device 140 through signal transmissions between the shifting device 140 and the electronic control system 120. Thus, the shifting device 140 can be manipulated to generate a signal to the electronic control system 120, which controls 110 in an appropriate manner.

The shifting device 140 preferably has a default or unadjusted position which it occupies when not being manipulated by the operator of the vehicle 100. In the default position, no changes are made to the operating state of the transmission 110. The operator changes the state of the transmission 110 by manipulating the shifting device 140 in a designated way. For example, where the shifting device is a joystick-like toggle switch, the default position can be in a vertical position. If the transmission is in a neutral state, an operator can adjust the state by moving the shifting device 140 to the right, relative to the operator. The shifting device 140 can transmit a signal to the electronic control system 120 indicating a shift to the reverse gear of the transmission 110 is desired. After releasing the shifting device 140, it preferably returns to the default position. Then, the operator can move the shifting device 140 to the left, relative to the operator, to indicate the neutral gear of the transmission 110. A second move to the left can cause the transmission 110 to be placed in a "park" gear, as commanded by the electronic control system 120. Other arrangements and shifting patterns can be used without limit.

The electronic control system 120 can also be coupled to the vehicle's transmission 110 through the ECS sensor 122. Additionally, the electronic control system 120 can be comprised of one or more processor-based devices, which may be physically integrated into a single component or circuit board. In certain embodiments, the electronic control system 120 can be distributed throughout the electronic and/or computing architecture of the vehicle 100, including integration with components performing additional functions.

The ECS sensor 122 can be of any type suited to the vehicle, transmission, and control system. Among other functions, the ECS sensor 122 can, in some embodiments, provide information or a signal to the electronic control system 120 indicating the current operational state of the transmission 110. Accordingly, the ECS sensor 122 can be of any type appropriate or desired for the embodiment, such as a potentiometer, piezoelectric sensor, or a group or array of sensors adapted to determine the operational state of the transmission 110. The ECS sensor 122 can be incorporated with or integrated into the electronic control system 120, transmission 110, or certain other devices as desired for the embodiment.

The electronic control system 120 can be implemented or performed with one or more processing components, such as a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The electronic control system 120 can also be coupled to the display device 130 to provide visual feedback to the operator of the vehicle based on information provided by the electronic control system 120. While one embodiment of the display device 130 is a light emitting diode or other lighting device emitting radiation within the human visual range, another can be a visual feedback assembly comprising a processor element, memory element, and other components adapted to operate a visual element. Accordingly, the electronic control system 120 can operate the display device 130 directly, or transmit signals to it, allowing for independent operation.

The display device 130 can be coupled to the vehicle's transmission 110 through a transmission sensor 132. Like the ECS sensor 122, the transmission sensor 132 can be of any type suited to the embodiment, and can be integrated into other components if appropriate or desired while still performing the described operations. Among other functions, the transmission sensor 132 can provide information or a signal to the display device 130 indicating the current operational state of the transmission 110, including the actual gear which the transmission 110 has engaged. The transmission sensor 132, and similarly, the ECS sensor 122, can transmit a signal containing information, as described below, continuously, or in response to detecting a change in operating state, or engaged or operable gear, or gear state, of the transmission 110.

The display device 130 can use any appropriate visual elements to accomplish the operations described. Some exemplary elements can include liquid crystal displays (LCDs), light emitting diodes (LEDs), including organic light emitting diodes (OLEDs), incandescent bulbs, and other visual feedback techniques and devices. Preferably, the visual elements can be manipulated by the display device 130 and/or electronic control system 120 to produce the effects described herein.

The visual nature of these and other graphical elements described herein can be indicated using visually distinguishable characteristics. In this regard, the different visually distinguishable characteristics may correspond to any of the following characteristics, individually or in any combination thereof: different colors; different brightness; different transparency levels; different translucency levels; different line patterns; different line thickness; different flicker patterns; different focus levels; different sharpness levels; and different clarity levels. Thus, although different and/or contrasting colors are described with regard to certain operations and visual elements, other characteristics can be used as well.

The vehicle 100 is operated by the described components to provide an electrical or electrically-assisted shifting arrangement. With such shifting arrangements, the operator can select among modes of operation of the vehicle 100 (e.g. "park," "reverse," "neutral," "drive"). The shifting device 140 can be used to select among the set operational states of the transmission 110 (e.g. "park," "reverse," "neutral," "drive,"), as described above. Other states and gears can also be represented in different embodiments, such as different drive gears, different driving modes, such as 4×4 operation, and so on. The representations can also vary between embodiments, as desired.

The electronic control system 120 can determine the current state of the transmission 110, such as with the ECS sensor 122. Additionally, the electronic control system 120 can provide feedback to the operator with the display device 130. For example, after shifting from a neutral gear to a reverse gear of the vehicle 100, the electronic control system 120 can operate the display device 130 to provide feedback indicating the transmission 110 is in the reverse gear. In some embodiments, the electronic control system 120 can provide information to the display device 130 that the transmission 110 is in the reverse gear, and the display device can 130, in addition to performing other operations, present the information to the operator.

One technique for providing information to the display device 130 can be the use of true and false signals and/or flags. As used herein, a true signal indicates information from the electronic control system 120 that a particular gear of the transmission 110 is engaged. For example, if the transmission 110 is in the neutral gear, the display device 130 can receive a signal for the neutral state indicating true. Conversely, a false signal can indicate that a particular gear of the transmission 110 is not engaged. Thus, if the transmission 110 is actually in the neutral gear, the electronic control system can receive a false signal for the park state. The display device 130 can receive a signal for each state of the transmission 110. Therefore, for a display device 130 illustrating the park, reverse, neutral, and drive states, when the transmission is in the reverse gear, the display device 130 will receive four signals from the electronic control system 120. One signal, associated with the reverse state, will contain a true signal. The remaining three signals, associated with the park, neutral, and drive states, will contain false signals. The display device 130 can operate one or more visual elements to convey information obtained through such signals.

In addition to signals received from the electronic control system 120, the display device 130 can receive signals from the transmission sensor 132. The signals received from the transmission sensor 132 can convey the current operational state of the transmission 110 in the same manner as those received from the electronic control system 120, as described above. Thus, the display device 130 can receive true and false signals from two independent components regarding the transmission 110. As used herein, independent components are those that they do not rely on each other for determining the state of the transmission. Accordingly, each component detects the engaged gear or operational state of the transmission without relying on information from the other.

Figure 2:
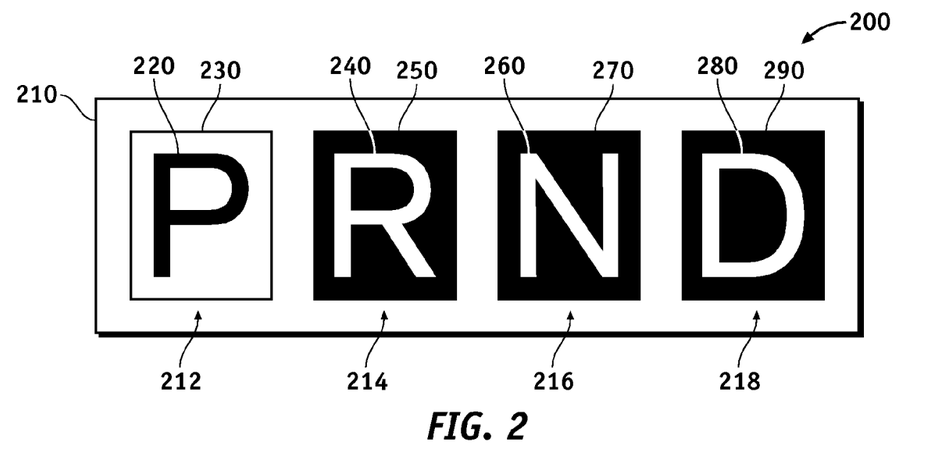
FIG. 2 is a diagram of an exemplary display device with error detection.

FIG. 2 is an embodiment of a sample display device 200, such as the one that can be used in the vehicle 100. A visual feedback device such as sample display device 200 can provide feedback to the operator of the vehicle in response to information received from the electronic control system 120 and/or the transmission 110. The illustrated embodiment comprises a display device background 210 and a set of transmission position indicators 212, 214, 216, 218. Each transmission position indicator 212, 214, 216, 218 consists of a foreground 220, 240, 260, 280, and a background 230, 250, 270, 290 and corresponds to one mode of operation of the vehicle or operational state of the transmission 110. The foregrounds 220, 240, 260, 280 and backgrounds 230, 250 270, 290 can be referred to as foreground portions, components, halves, or any other reference consistent with their contribution to form a combination, assembled, or composite image.

Transmission position indicator 212 represents the "park" mode of operation of the vehicle 100. The foreground 220 resembles the letter "P" to denote "park" to the operator of the vehicle 100. Its corresponding background 230 can be of a contrasting color when compared to the foreground 220. In this embodiment, the foreground 220 and background 230 for transmission position indicator 212 are black and white respectively. When the current operational state of transmission 110 is in the "park" position, the transmission position indicator 212 displays a contrasting color combination to the operator of the vehicle 100, providing visual feedback to the operator by highlighting the letter "P". It should be appreciated that while the background portions 230, 250, 270, 290 are shaped in a square shape, other geometric shapes, regular and irregular, can be used as desired for the embodiment.

Transmission position indicators 214, 216, 218, represent the "reverse", "neutral", and "drive" states of the transmission 110, respectively. When the transmission 110 is not in the operational state corresponding to the transmission position indicator, the indicator can reverse the color combination. Thus, while the park transmission position indicator 212 has a black foreground 220 and a white background 230, each remaining transmission position indicator 214, 216, 218 displays a white foreground 240, 260, 280 and a black background 250, 270, 290. When the current operational state of transmission 110 is not in the "park" position, the transmission position indicator 212 changes to display a similar color arrangement.

Similarly, when the transmission 110 is adjusted to select a reverse gear, the transmission position indicator 214, representing the "reverse" mode of operation of the vehicle 100, will adjust its foreground 240 to a black color, and its background 250 to a white color. Transmission position indicator 216, representing the "neutral" mode of operational state of the transmission 110, and transmission position indicator 218, representing a "drive" gear of the transmission 110 operate in a similar fashion. While one arrangement of symbolic representations of operational states is shown, others are possible, including different letters for different languages, for example. Similarly, number schemes, physical layout, and other aspects of the exemplary display device 200 can be adjusted without departing from the spirit of the embodiments disclosed herein. The present arrangement is used throughout for exemplary and descriptive purposes.

Figure 3:
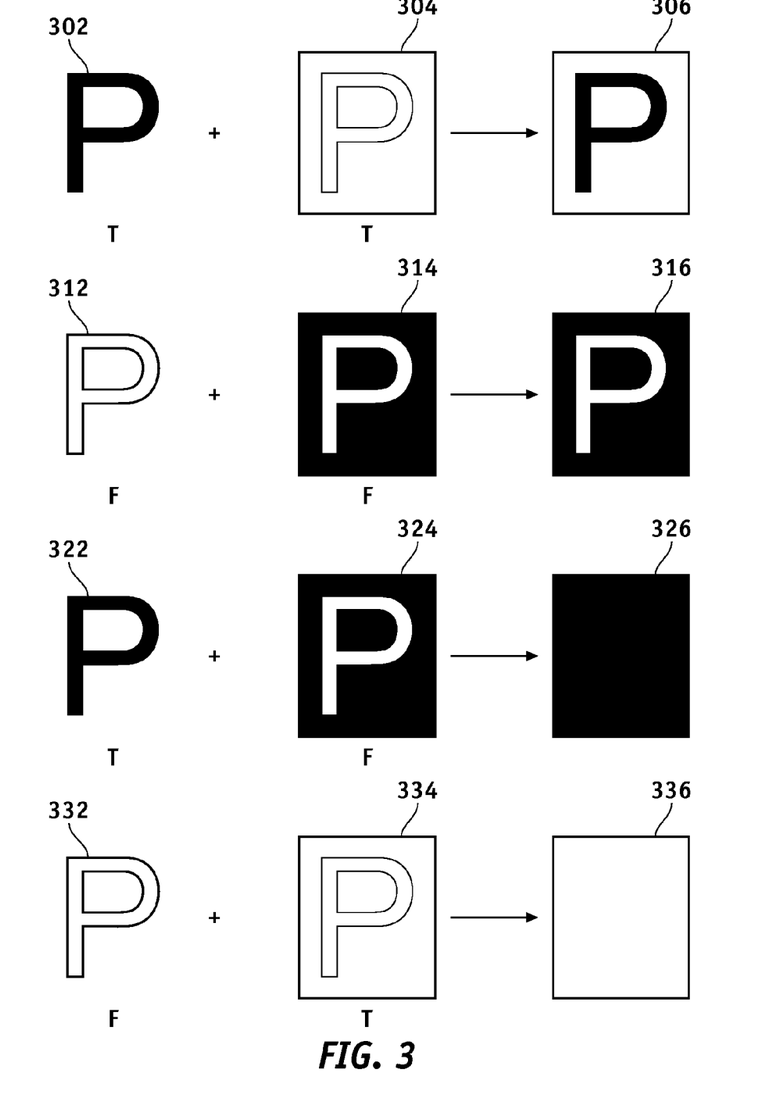
FIG. 3 is an illustration of several exemplary displays that can be rendered with the display device of FIG. 2.

FIG. 3 represents a sample configuration of display possibilities of transmission position indicator 216 and its corresponding foreground 220 and background 230. FIG. 3 represents a true/false table including the foregrounds 302, 312, 322, 332 and backgrounds 304, 314, 324, and 334. The resulting display combinations 306, 316, 326, and 336 provide the final visual display feedback to the operator of the vehicle 100, such as with the display device 130.

In the sample configuration shown in FIG. 3, the contrasting colors of black and white are again used to represent the foregrounds 302, 312, 322, 332 and backgrounds 304, 314, 324, and 334, respectively. In other embodiments, any contrasting colors could be used to create a similar display configuration to that shown in FIG. 3. Other exemplary color schemes can include red and white, red and blue, black and yellow, black and green, red and green, orange and brown, and so forth.

The foreground 302 is a black "P", which corresponds to a true signal transmitted from the electronic control system 120 to the display device 130 for the park state. The background 304 is a white section with an omitted central "P" shape, the omitted area corresponding to, and aligned with, the foreground 302. The use of white in the background 304 represents a true signal from the transmission sensor 132 to the display device 130.

Each display combination 306, 316, 326, 336 is the result of superimposing a foreground above a corresponding background. Thus, the display combination 306 illustrates the foreground 302 centered above the background 304. The resulting display combination 306 is a black "P" on a white background. This arrangement can be familiar to the vehicle's operator as indicating that the transmission 110 is in the "park" gear.

Thus, the display combination 306 represents the result of two true signals, received from both the electronic control system 120 and the transmission sensor 132. Both the electronic control system 120 and the transmission 110 detect the state of transmission 110 to be in "park".

The foreground 312 is a white "P", representing a false signal transmitted from the electronic control system 120. The background 314 is a black field with an omitted "P" shaped segment aligned with the foreground 312. The black color is used when a false signal is received from the transmission sensor 132 for the park state. Thus, for the representations in the second line of FIG. 3, the engaged gear of the transmission 110 is not the "park" gear. The display combination 316 is therefore a white "P" on a black background, representing a false statement transmitted from both the transmission 110 to the display device 130. The operator can identify the displayed representation as an indication that the vehicle 100 and transmission 110 are working properly and are operating in a different gear than "park".

The third and fourth lines of arrangements in FIG. 3 represent conflicting signals from the electronic control system 120 and transmission sensor 132. The inability to see a discernable representation in the display combinations 326, 336 can alert the operator to a potential error in the transmission 110 and/or electronic control system 120. The operator can, therefore, quickly identify that a possible transmission error is present, and can refrain from further operation of the vehicle 100, including providing the engine with an acceleration command.

The foreground 322 is a black "P", representing a true signal from the electronic control system 120. The background 324 is a black field with an omitted "P" shape, corresponding to a false signal from the transmission sensor 132. The display combination 326, therefore, is a black "P" on a black background, resulting in a single solid black square. The display combination 326 indicates that inconsistent signals have been received regarding the state of the transmission, and can alert the operator to address the issue prior to continuing travel. Similarly, in the fourth line, mismatched false and true signals have been received from the electronic control system 120 and transmission sensor 132, respectively. Accordingly, the white representations of both foreground 332 and background 334 are present. The resulting display combination 336 is a solid white square, which alerts the operator to a potential transmission issue prior to further operation.

Figure 4:
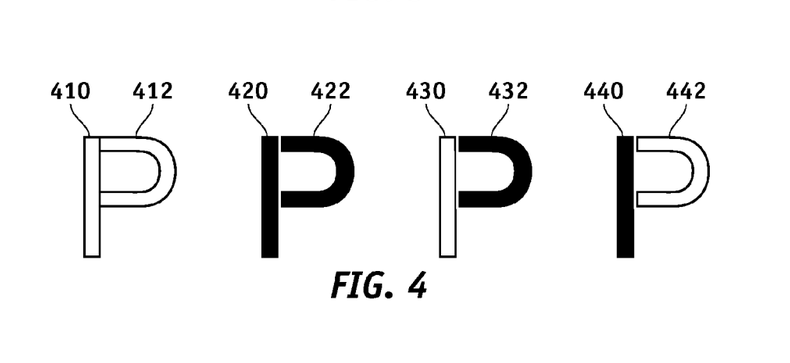
FIG. 4 is an illustration of exemplary displays that can be rendered with a display device.

FIG. 4 represents an alternative sample configuration of display possibilities of display device 130. Rather than fore- and backgrounds, electronic control system displays 410, 420, 430, 440 and transmission displays 412, 422, 432, 442 are used. The resulting display combinations 410/412, 420/422, 430/432, 440/442 provide the final visual display feedback to the operator.

In this embodiment, the letter "P" is used to denote the "park" mode of operation for transmission 110. Other sample configurations could include the display of other transmission position indicators, such as the letters "R" for the "reverse" gear of the transmission, "N" for the "neutral" gear of the transmission 110, and "D" for the "drive" gear of the transmission 110. These embodiments could provide similar visual feedback to the operator of the vehicle 100, and could function in the same manner as the sample configuration shown in FIG. 4.

In the sample configuration shown in FIG. 4, the contrasting colors of black and white are again used to represent the electronic control system displays 410, 420, 430, and 440, and the transmission displays 412, 422, 432, 442. In other embodiments, any contrasting colors could be used to create a similar display configuration to that shown in FIG. 4, as previously explained.

Electronic control system display 410 is a white half of "P". In this embodiment, the half of "P" consisting of the electronic control system display 410 is the vertical shaft. Electronic control system display 410 represents a true signal from the electronic control system 120 to the display device 130. Thus, the transmission 110 is in the "park" gear. Transmission display 412 is a white half of "P". In this embodiment, the half of "P" consisting of the transmission display 412 is the curve. Although referred to as halves, they do not have to represent 50% of the image, as measured by either area or size, but rather indicate that they are a two component images that together form a combination. Transmission display 412 represents a true statement from the transmission sensor 132 to the display device 130. The resulting display combination of electronic control system display 410 and transmission display 412 represents the consistent true signals, verifying that both the electronic control system 120 nor the transmission sensor 132 indicate the state of transmission 110 to be the "park" gear. The visual feedback provided to the operator of the vehicle 100 is a complete, white "P", indicating to the operator that the vehicle 100 is in "park". Because the signals are consistent, the formed "P" is a displayed as single color, recognizable to the operator as normal operation. The combination can be displayed on a background, including any desired color.

Electronic control system display 420 is a black half of "P". In this embodiment, the half of "P" consisting of the electronic control system display 420 is the vertical shaft. Electronic control system display 420 represents a false statement from the electronic control system 120 to the display device 130. At present, therefore, the selected gear of the transmission 110 is not "park". Transmission display 422 is a black half of "P". Transmission display 422 represents a false signal from the transmission sensor 132 to the display device 130. The resulting display from the combination of electronic control system display 420 and transmission display 422 represents consistent or matching signals, verifying that both the electronic control system 120 and the transmission sensor 132 show the currently-engaged gear of transmission 110 is not the "park" gear. The visual feedback provided to the operator of the vehicle 100 is a complete, black "P", indicating to the operator that the vehicle 100 is not in "park". Additionally, it should be understood that the true and false colors can be reversed, so long as they are consistent and the result is identifiable to the operator. Preferably, in the embodiment of FIG. 4, the two portions forming a representation do not display different colors than the other portion when both receive true signals or both receive false signals. In other embodiments, more fractional portions of the combined image can be used, such as four components of the combined image, six, eight, nine, and so on. Preferably a portion of the image components are responsive in a manner similar to the described first half, while another portion of the image components are responsive in a manner similar to the described second half. Other combinations and arrangements are also contemplated, and the embodiments are not limited to the described two portions shown.

Electronic control system display 430 is a white half of "P", indicating a true signal for the park gear or state from the electronic control system 120. Transmission display 432 is a black half of "P", indicating a false signal for the park gear or state from the transmission sensor 132. The resulting combination of electronic control system display 430 and transmission display 432 is an inconsistent "P", half black and half white. The inconsistency can be immediately recognizable by the operator as indicative of a potential issue with the transmission 110. Similarly, the black half of the electronic control system display 440 and white half of transmission display 442 is a white half of "P" can combine to indicate a mismatch of signals regarding the currently-engaged gear of the transmission 110.

It should be appreciated that the display device 130 can have different functions for performing the described tasks in different embodiments. For example, a processor-driven embodiment can perform logical operations to determine which portions of each display indicator should be displayed with certain colors or arrangements. In other embodiments, the display device 130 can be present as a simple lighting element where each portion of a transmission position indicator can be lit or not depending on a voltage received from the electronic control system 120 and/or transmission sensor 132. In such an arrangement, a true signal could transmit a voltage, resulting in a white, lit visual element, whereas a false signal could be the absence of a voltage, resulting in a black, unlit visual element. Other techniques for performing the described operations and features can also be used. Additionally, some functions and/or operations can be performed by different components in different embodiments. For example, in certain embodiments, the transmission sensor 132 can be coupled to the electronic control system 120 instead of, or in addition to, its coupling to the display device 130. The electronic control system 120 can receive information from both the transmission 110 directly, as well as the transmission sensor 132, and perform operations to determine if a set of inconsistent gear position indicators is produced. The electronic control system 120 can then operate the display device 130 to present information indicative of the transmission 110 in a manner similar to that previously described.

Figure 5:
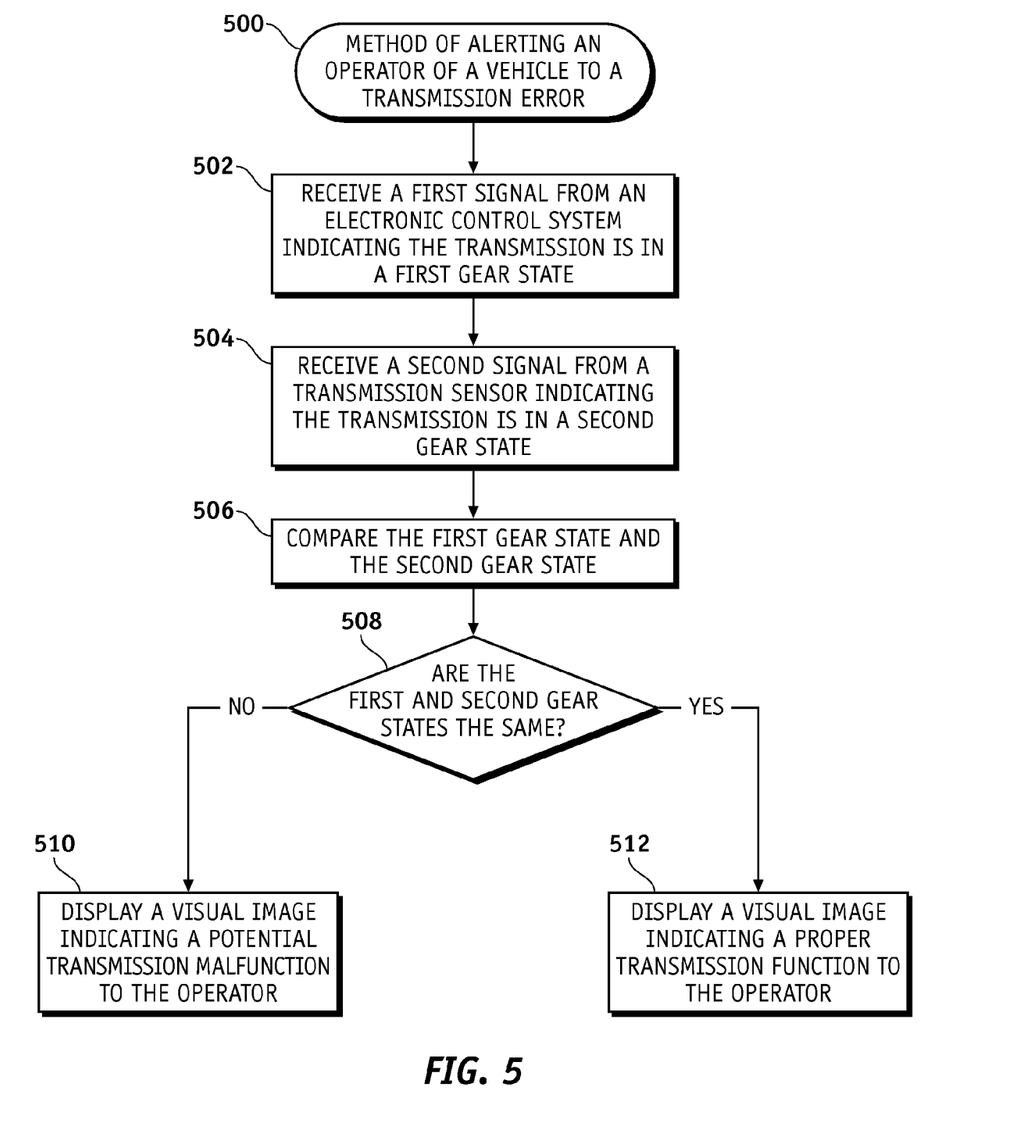
FIG. 5 is a flow chart that illustrates a method of alerting a user to a potential fault in a vehicle.

FIG. 5 illustrates a method 500 of alerting an operator of a vehicle to a potential error in the transmission of the vehicle. The various tasks performed in connection with method 500 may be performed by software, hardware, firmware, or any combination thereof. For illustrative purposes, the following description of method 500 may refer to elements mentioned above in connection with FIGS. 1-4. In practice, portions of method 500 may be performed by different elements of the described system, e.g., electronic control system 120, display device 130, or transmission sensor 132. It should be appreciated that method 500 may include any number of additional or alternative tasks, the tasks shown in FIG. 5 need not be performed in the illustrated order. Additionally, method 500 can be incorporated into a more comprehensive procedure or process having additional functionality not described in detail herein.

In the first step, a display device 130 can receive a first signal from an electronic control system 120 indicating the transmission 110 is in a first gear state (task 502). The signal can be received after a gear change request is made with a shifting device 140, or at any other time. The electronic control system 120 can continuously transmit a signal, or can send a new signal only after a gear change request is made with the shifting device 140. The signal can be a single signal or a sequence, and can convey more information than the first gear state. The information indicating the first gear state is preferably a "true" or "false" signal, and thus the first signal can include true and/or false information for each possible gear state.

The display device 130 can receive a second signal from the transmission sensor 132, the second signal indicating the transmission is in a second gear state (task 504). The second signal can be similar to the first signal, conveying the same information range. The first and second gear states can be the same, or different, and numerically indicate the source of the information, and not a distinction between different gear states. The display device 130 can then compare the first gear state to the second gear state to determine if they are the same gear state, or different, according to both the electronic control system 120 and transmission sensor 132 (tasks 506, 508).

If the first and second gear states are not the same, that is, the first and second signals indicate different gear states, the display device can present a visual image indicating a potential transmission malfunction to the operator (task 510). Such a visual image can include a previously-described arrangement indicating mismatched sensor signals. If, however, the first and second gear states are the same, that is, the first and second signals indicate the same gear state, the display device can present a different visual image to the operator (task 512). Once again, the visual image can include an arrangement of elements as previously described indicating consistent signals from two different components.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An information presentation system for a vehicle, the vehicle comprising a transmission operable in a plurality of gear states, and the system comprising:
    a sensor adapted to detect an actual gear state of the transmission;
    an electronic control system adapted to operate the transmission and to detect a commanded gear state of the transmission; and
    a display device coupled to the sensor and to the electronic control system, the display device adapted to:
    receive a first signal indicating the actual gear state of the transmission;
    receive a second signal indicating the commanded gear state of the transmission; and
    adjust an arrangement of visual elements based on whether the first and second signals indicate that the commanded gear state is different from the actual gear state.

2. The system of claim 1, the wherein the arrangement of visual elements comprises a first foreground image and a first background image, the first foreground image and the first background image having different visually distinguishable characteristics.

3. The system of claim 2, wherein the display device is further adapted to display the first foreground image and the first background image as different colors.

4. The system of claim 3, wherein the arrangement of visual elements comprises the first foreground image and a second background image, the first foreground image and the second background image being the same color.

5. The system of claim 3, wherein the arrangement of visual elements comprises a second foreground image and the first background image, the second foreground image and the first background image being the same color.

6. The system of claim 1, wherein the arrangement of visual elements comprises a first graphical representation of a gear state, the first graphical representation comprising of a first half and a second half, the first and second halves having the same distinguishing characteristics.

7. The system of claim 6, wherein the first and second halves are the same color.

8. The system of claim 6, wherein the first and second halves are different colors.

9. The system of claim 1, further comprising a shifting device, the shifting device coupled to the electronic control system and adapted to transmit a third signal, the third signal containing information indicating a gear change request.

10. The system of claim 1, wherein the sensor is adapted to transmit the first signal in response to detecting a change in gear state of the transmission.

11. The system of claim 1, wherein the electronic control system is adapted to transmit the second signal in response to detecting a change in gear state of the transmission.

12. The system of claim 1, wherein the display device comprises a liquid crystal display.

13. A display device for a vehicle, the vehicle comprising a transmission having a plurality of gear states, the display device adapted to:
    receive a first signal that is indicative of a commanded gear state of the transmission;
    receive a second signal that is indicative of an actual gear state of the transmission;
    display a first visual image comprising a first foreground portion and a first background portion when the first and second signals indicate the same gear state of the transmission; and
    display a second visual image comprising a second foreground portion and a second background portion when the first and second signals indicate different gear states of the transmission.

14. The display device of claim 13, wherein the first foreground portion and the first background portion have different colors.

15. The display device of claim 13, wherein the second foreground portion and the second background portion have the same color.

16. The display device of claim 13, wherein the second visual image comprises a geometric shape of a solid color.

17. A method of displaying transmission gear state information to an operator of a vehicle, the transmission operable in a plurality of gear states, and the method comprising:
    receiving a first signal from an electronic control system coupled to the transmission, the first signal conveying information indicating a gear state of the transmission;
    determining a gear state of the transmission with a sensor, the sensor operating independently of the electronic control system;
    receiving a second signal from a sensor coupled to the transmission, the second signal conveying information indicating a gear state of the transmission;

comparing the gear state indicated by the first signal to the gear state indicated by the second signal; and presenting a first visual image to the operator of the vehicle in response to determining that the first and second signals convey information indicating different gear states.

18. The method of claim 17, wherein the first visual image comprises a first portion and a second portion, the first and second portions having the same color.

19. The method of claim 18, further comprising presenting a second visual image to the operator of the vehicle in response to determining that the first and second signals contain information indicating the same gear state.

20. The method of claim 16, wherein receiving the first signal comprises receiving a plurality of state signals, each state signal corresponding to one of the plurality of gear states.

* * * * *